United States Patent [19]

Zacaroli

[11] 3,851,115

[45] Nov. 26, 1974

[54] SELF-CONTAINED LOW CROSSFEED TAPE CASSETTE ASSEMBLY

[75] Inventor: Edward C. Zacaroli, Utica, N.Y.

[73] Assignee: Hamilton Digital Controls, Inc., Utica, N.Y.

[22] Filed: Oct. 4, 1971

[21] Appl. No.: 186,073

[52] U.S. Cl.... 179/100.2 C, 179/100.2 Z, 242/199, 242/210, 274/4 C

[51] Int. Cl. .......................... G11b 5/00, G11b 23/10

[58] Field of Search ........... 242/199, 200, 198, 197, 242/194, 71.1, 71.2, 210; 179/100.2 Z, 100.2 C; 274/4 C, 11 C

[56] References Cited

UNITED STATES PATENTS 2,981,805 4/1961 Conly .......................... 179/100.2 C 3,495,787 2/1970 Wallace .......................... 242/199

*Primary Examiner*—George F. Mautz

*Attorney, Agent, or Firm*—Howard C. Miskin

[57] ABSTRACT

A magnetic tape cassette in which crossfeed is minimized includes a case housing tape reels and guides leading the tape across the magnetic head access opening in the case front wall. A leaf spring supported behind the opening carries a pressure pad resiliently bearing on the tape and including a backing plate of high magnetic permeability having a soft resilient pad on its front face or a soft resilient pad having a dispersed particulate high permeability material.

7 Claims, 3 Drawing Figures

INVENTOR.
EDWARD C. ZACAROLI
BY
Howard C. Miskin
INVENTOR.

SELF-CONTAINED LOW CROSSFEED TAPE CASSETTE ASSEMBLY

BACKGROUND OF THE INVENTION

The present invention relates generally to improvements in magnetic tape cartridges or cassettes and it relates more particularly to an improved magnetic tape cassette in which crosstalk or crossfeed is minimized during the use thereof.

An important shortcoming in magnetic tape recording is the presence of excessive crossfeed or crosstalk during recording and playback and this drawback is particularly serious with the use of dual gap write/read magnetic transducer heads. As used in the specification and claims, "crossfeed" means write to read crosstalk or feedthrough which occurs as a consequence of the magnetic flux generated at the write in transducer element entering the read out transducer element. Various systems have been heretofore employed and proposed to eliminate or reduce this crossfeed, both of an electrical and magnetic nature, such as by the use of external magnetic shields or circuits on the head, but these systems are complex, and bulky, are not generally suitable for use with the conventional magnetic tape cassettes and otherwise leave much to be desired. Because the head is inserted into the cassette opening, adequate external shielding is awkward and difficult to provide. In cassette applications using dual gap write/-read magnetic transducer heads crossfeed has been reduced to acceptable levels by increasing the spacing between read and write transducer elements to a greater than desired amount. Accordingly crossfeed with the use of dual gap, write/read transducer heads for use with magnetic tape cassettes has heretofore been tolerated.

SUMMARY OF THE INVENTION

It is a principal object of the present invention to provide an improved magnetic tape recording and playback device.

Another object of the present invention is to provide an improved magnetic tape cassette.

Still another object of the present invention is to provide an improved magnetic tape cassette in which crossfeed attendant to the use of the cassette is minimized.

A further object of the present invention is to provide an improved magnetic tape cassette of the above nature characterized by its low, self-contained crossfeed, simplicity, low cost, reliability, adaptability, versatility, and ease and convenience of use.

The above and other objects of the present invention will become apparent from a reading of the following description taken in conjunction with the accompanying drawing which illustrates a preferred embodiment thereof.

In a sense, the present invention contemplates the provision of a magnetic tape cassette comprising a case having an aperture in a peripheral wall thereof for exposing tape for engagement by a magnetic transducer head, a tape carrying reel disposed in the case, guide means for leading magnetic tape from the reel along a path registering with the aperture with the front face of the tape directed outwardly through the aperture, and a pressure pad of high magnetic permeability supported in the case and bearing on the rear face of the tape in registry with the aperture.

In its preferred form the improved cassette includes a longitudinally extending spring supported in the case behind the magnetic head receiving aperture and the pressure pad is medially mounted on the spring and is of a height somewhat greater than the width of the magnetic tape. The pressure pad includes a backing plate of a material having a high magnetic permeability, such as mu metal or the like, and a low friction soft, resilient, deformable pad such as a felt, soft or sponge rubber or similar material, which covers the front face of the backing plate and is resiliently urged by the spring mounted backing plate into engagement the rear face of the magnetic tape. A particulate or finely powdered high magnetic permeability material such as mu metal or the like is advantageously dispersed in the resilient pad in which case the high magnetic permeability of the backing plate may in some cases be obviated.

The improved magnetic tape cassette greatly reduces crossfeed without any significant increase in the cost of the cassette and in the absence of any change in the size, overall configuration or general application thereof. The crossfeed reduction structure is highly versatile and adaptable and may be applied to any of the conventional magnetic tape cassettes without in any way interfering with the normal use thereof.

DESCRIPTION OF THE PREFERRED EMBODIMENT

Figure 1:
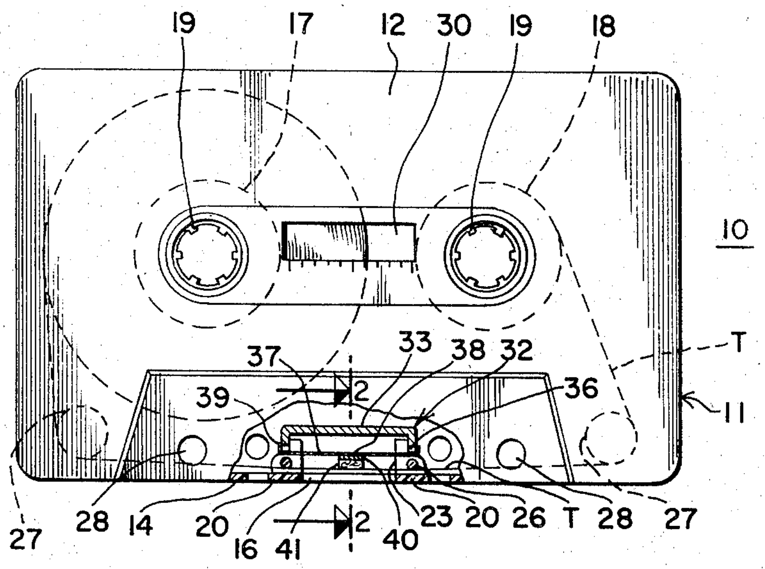
FIG. 1 is a top plan view, partially broken of a magnetic tape cassette embodying the present invention.
Figure 2:
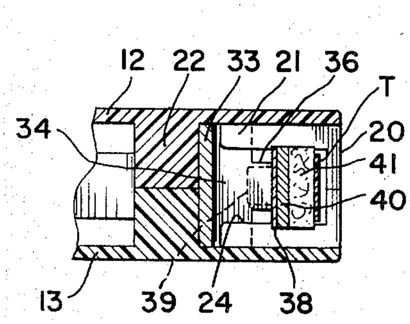
FIG. 2 is an enlarged sectional view taken along line 2—2 in FIG. 1.

Referring now to the drawing which illustrates a preferred embodiment of the present invention as applied to a two reel magnetic tape cassette of generally conventional construction, except as hereinafter described, it being understood that the present invention is applicable as well to magnetic tape cartridges and cassettes of other construction, the reference numeral 10 generally designates the improved magnetic tape cassette. The cassette 10 comprises a flat rectangular case 11 assembled from a pair of injection molded top and bottom shells and includes parallel top and bottom walls 12 and 13 respectively and peripheral walls including a vertical front wall 14 having a medially located rectangular front window or opening 16 for the reception of a recording and playback magnetic transducer head as well as other openings for the reception of an erasing head and a tape pressure roller in the known manner.

A pair of laterally spaced horizontal reels 17 and 18 are housed in case 11 and are provided with internally splined hubs 19 journalled in opposite openings in case walls 12 and 13 and adapted to releasably engage corresponding splined drive spindles associated with a cooperating recorder, not shown. The transducer opening 16 is flanked by vertical panels 20, which join blocks 21 which are integrally formed with the case top and bottom walls 12 and 13 and extend rearwardly to points short of a longitudinal vertical partition 22 extending between walls 12 and 13. The blocks 20 include laterally spaced transversely extending parallel confronting faces 23 coplanar with the inner edges of panels 20 and vertically spaced confronting horizontal faces 24. Vertical guide rods 26 extend between upper and lower blocks 21, shortly behind panels 20 and laterally outwardly of their inner edges, and vertical guide posts 27 are located in case 11 proximate the case front corners.

A magnetic recording tape T is wound about reels 17 and 18 and extends from one reel 17 along a path about the outer periphery of a proximate guide post 27 along the front faces of guide rods 26, crossing window 16 between the guide rods 26, then about the outer periphery of the other guide post 27 and to reel 18. Pairs of vertically aligned openings 28 are formed in casing walls 12 and 13 in transverse medial alignment with the erasing head and pressure roller openings, for the sliding reception of a capstan 29 in the known manner. Also formed in case walls 12 and 13 are rectangular tape viewing windows 30 which are located between the hubs 19, which give an indication of the amount of tape on each reel.

Housed in the case 11 between partition 22 and window 16 is a metal bracket 32, which includes a vertical rear wall 33 abutting the front face of partition 22 and engaging the confronting faces of case walls 12 and 13, its upper and lower corners being entrapped between partition 22 and blocks 21. Legs 34 are integrally formed with and project forwardly from the ends of rear wall 33 and their top and bottom corners engage respective rear outer corner faces of block 21. The legs 34 terminate in medially located forwardly directed arms 36 of less heights than legs 34, arms 36 terminating at points shortly behind guide rods 26.

A highly flexible resilient leaf spring 37 having a vertically enlarged medial section 38 projecting above and below spring 37 is of elongated rectangular configuration and lies in a vertical plane and extends horizontally between the free ends of bracket arms 36 at a level intermediate case walls 12 and 13. The outer ends of leaf spring 37 terminate in rearwardly directed lugs 39 which tightly embrace the outer faces of bracket arms 36 when spring 37 is in a flat planar unstressed condition as shown in FIG. 1.

Suitably mounted on and coextensive with the enlarged section 38 of leaf spring 37 is a block or backing plate 40 formed of a high magnetic permeability material, advantageously of a magnetic permeability such as mu metal, magnetic ferrites and the like. Superimposed on and cemented or otherwise secured to the front face of backing plate 40 and coextensive therewith is a soft, resilient deformable pad 41, formed, for example, of felt, foamed natural or synthetic rubber or foamed synthetic organic polymeric resins having low friction coefficients. Advantageously, heavily dispersed throughout pad 41 in any suitable manner, is a finely particulate or powdered material of high magnetic permeability, likewise advantageously, such as mu metal, magnetic ferrites and the like. The finely particulate material is dispersed in the pad 41 in a manner so as not to provide an abrasive front face on pad 41. The pad 41 is of a thickness, softness and deformability as to assume the curved shape of the front face of a magnetic transducer head under the influence of leaf spring 37.

The improved cassette 10 is employed with a conventional recorder 42 in the usual manner. The recorder

Figure 3:
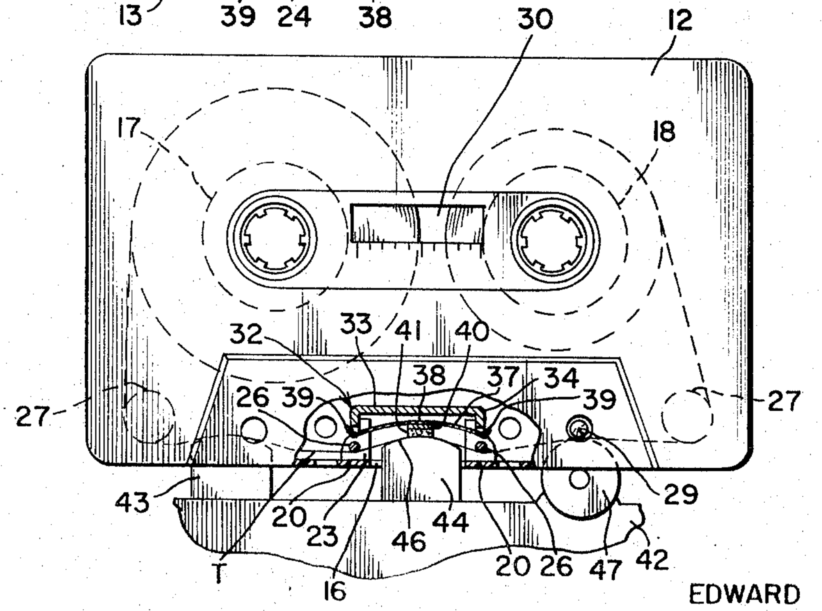
FIG. 3 is a view similar to FIG. 1 illustrating the cassette in operative association with a tape drive, erasing head, and magnetic transducing head.

42 includes the laterally spaced rearwardly directed erasing head 43, recording and playback magnetic transducer head 44 having a longitudinally curved front face 46, and resilient pressure roller 47, the recorder capstan 29 being disposed forwardly of roller 47. The cassette 10 is applied to the recorder 42 in the usual manner with the hub 19 being engaged by the recorder spindles, the capstan 29 registering with corresponding openings 28, the tape T being embraced between capstan 29 and pressure roller 47, and erasing head 43 engaging tape T proximate a guide post 27. The transducer head 44 projects into window 16 and presses tape T against pad 41 to curve tape T and deform the front face of pad 41 to conform to the shape of head front face 46 and to load and deflect spring 37 rearwardly as shown in FIG. 3 whereby to maintain a suitable pad pressure against the rear of tape T toward transducer head 44.

The tape T is driven and recording and playback are effected through transducer head 44 in the known manner. However, by reason of the close proximity of the high magnetic permeability shield as represented by the high magnetic permeability backing plate 40 and pad 41 and their spatial relationship to the recording and playback face and gap of transducer head 44, crossfeed is radically reduced and important disadvantages and drawbacks in the use of magnetic tape cassettes are overcome.

While there has been described and illustrated a preferred embodiment of the present invention it is apparent that numerous alterations, omissions and additions may be made without departing from the spirit thereof. For example, a high reduction in crossfeed may be achieved by employing the pad 41 provided with the dispersed particulate high magnetic permeability material without the use of a backing plate of high magnetic permeability or by employing a backing plate of high magnetic permeability without the pad 41 having dispersed therein the high magnetic permeability material.

What I claim is:

1. A magnetic tape cassette comprising a case having an aperture in a peripheral wall thereof for exposing tape for engagement by a magnetic transducer head, a tape carrying reel disposed in said case, guide means for leading magnetic tape from said reel along a path registering with said aperture with the front face of said tape directed outwardly through said aperture, a pressure pad of high magnetic permeability supported in said case and bearing on the rear face of said tape in registry with said aperture and resilient means engaging said pressure pad for urging said pad toward said tape and said tape toward said transducer head.

2. The magnetic tape cassette of claim 1 wherein said pressure pad includes a material selected from the class consisting of mu metal and magnetic ferrite materials.

3. The magnetic tape cassette of claim 1 wherein said pressure pad comprises a rear member formed of a magnetic material having a high magnetic permeability and a front member of soft resilient material overlying the front face of and secured to said rear member.

4. The magnetic tape cassette of claim 1 wherein said resilient means comprises a spring member positioned in said case behind said aperture and supporting said pressure pad.

5. The magnetic tape cassette of claim 1 wherein said resilient means comprises a longitudinally extending leaf spring located behind said aperture and supporting said pressure pad.

6. The magnetic tape cassette of claim 1 wherein said case includes top and bottom walls and including a pair of spring mount elements located between said top and bottom walls and behind and proximate opposite sides of said aperture, and said resilient means comprises a leaf spring extending between and engaging said mount, said pressure pad being positioned on the front face of said leaf spring.

7. A magnetic tape cassette comprising a case having an aperture in a peripheral wall thereof for exposing tape for engagement by a magnetic transducer head, a tape carrying reel disposed in said case, guide means for leading magnetic tape from said reel along a path registering with said aperture with the front face of said tape directed outwardly through said aperture and a pressure pad of high magnetic permeability including a front section of soft resilient material having dispersed therein a material of high magnetic permeability in a finely divided state supported in said case and bearing on the rear face of said tape in registry with said aperture.

* * * * *